Sept. 27, 1966  W. ZÜRKER  3,275,160
CLAMPING DEVICE FOR SKIS
Filed April 21, 1964  4 Sheets-Sheet 1

INVENTOR.
Walter Zürker
BY
Michael J. Striker
Atty.

Sept. 27, 1966 W. ZÜRKER 3,275,160
CLAMPING DEVICE FOR SKIS
Filed April 21, 1964 4 Sheets-Sheet 4

INVENTOR.
Walter Zürker
BY
Michael J. Striker

United States Patent Office 3,275,160
Patented Sept. 27, 1966

3,275,160
CLAMPING DEVICE FOR SKIS
Walter Zürker, 33 Zugspitzstrasse, Garmisch-Partenkirchen, Germany
Filed Apr. 21, 1964, Ser. No. 361,390
Claims priority, application Germany, Apr. 26, 1963, Z 10,081; July 9, 1963, Z 10,216; Aug. 8, 1963, Z 10,286; Dec. 21, 1963, Z 10,545
29 Claims. (Cl. 211—60)

The present invention relates to clamping devices for skis. More particularly, the invention relates to a theftproof and burglarproof clamping device which will at least hinder a thief or a burglar in feloniously removing one or more pairs of skis from the utility rack of an automotive vehicle; from the storage room of a hotel, ski lodge, railroad station or bus station; from an airport terminal or a similar establishment; and from private homes or apartment houses.

It is an important object of my invention to provide a simple, lightweight, sturdy, easy-to-handle, eye-pleasing and inexpensive clamping device for one or more pairs of skis which can be manipulated by children or adults, which can be used independently of or in conjunction with fixed supports, which will cause no damage to the skis, and which may be readily and rapidly converted for attachment to a single pair of skis or to two or more pairs.

Another object of the invention is to provide a clamping device of the just outlined characteristics which is capable of retaining and locking one or more pairs of skis on an automotive vehicle without producing any noise, wherein one or more skis may be clamped in neatly arrayed position and in close proximity to each other, and which may be readily transferred from a vehicle to a stationary support or vice versa.

A concomitant object of my invention is to provide a clamping device which may be installed on many existing storage or utility racks for automotive vehicles or the like and which may be permanently or detachably secured to stationary supports in private homes, apartments, public places and similar establishments to protect skis against theft or burglary as a service to customers, against the payment of a fee, or both.

Still another object of the invention is to provide a storage rack or utility rack which comprises one or more theftproof clamping devices of the above outlined characteristics.

Another object of the invention is to provide a clamping device for skis which cannot be pried open by conventional burglar's tools, which cannot be broken excepting by exertion of substantial forces, which can be mass-produced of readily available materials, which can be furnished in different colors so that the owner will be assisted in rapidly locating his or her skis in a public depository which accommodates large numbers of skis, which can be manufactured at a cost low enough to warrant its distribution as a bonus to buyers of expensive skis, and which may also serve as an advantageous substitute for conventional straps of the type presently used to hold a pair of skis together during transportation or during ascent to the starting point of a skiing trip.

A further object of the instant invention is to provide a clamping device which comprises a very small number of interconnected parts so that the owner is not likely to misplace its components when the clamping device is not in use, and which may be left on the skis during summer so as to be immediately at hand when the user desires to take a skiing vacation or a short skiing trip.

With the above objects in view, one feature of my invention resides in the provision of a theftproof or burglarproof clamping device for skis which comprise a base member, a cover member attached to and movable with reference to the base member between a first position in which the two members define between themselves at least one passage for reception—with minimal clearance—of at least one ski and a second position in which a ski normally extending through such passage is readily accessible and may be lifted out of the clamping device, and a locking device preferably including a key-operated lock which comprises cooperating parts arranged to lock the two members to each other in the first position of the cover member.

Each member may comprise several sections and the base member may be detachably or permanently secured to a utility rack on the roof, side or rear wall of an automotive vehicle, to the wall of a storage room in a hotel or a similar establishment, or to a specially constructed wall structure in which case its lock is operated by coins so that the clamping device may serve not unlike a coin-operated box, for example, at the terminal of a mountain railroad or at the stops of a bus line leading to or from a skiing resort.

The novel features which are considered as characteristic of the invention are set forth in particular in the appended claims. The improved clamping device itself, however, both as to its construction and its mode of operation, together with additional features and advantages thereof, will be best understood upon perusal of the following detailed description of certain specific embodiments with reference to the accompanying drawings, in which:

FIG. 30 is a longitudinal section through an eleventh clamping device which may accommodate two pairs of skis and wherein the cover member is again rotatable about an axis which is perpendicular to its plane;

Figure 1:
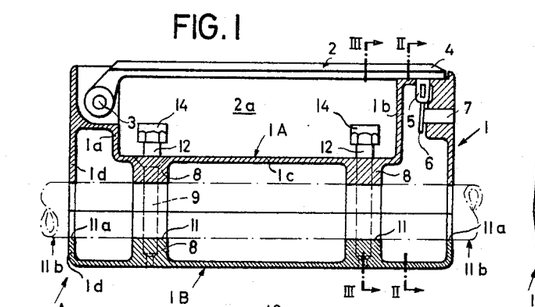
FIG. 1 is a longitudinal section through a clamping device which embodies one form of my invention and which is shown in operative position, the section of FIG. 1 being taken in the direction of arrows as seen from the line I—I of FIG. 2.
Figure 2:
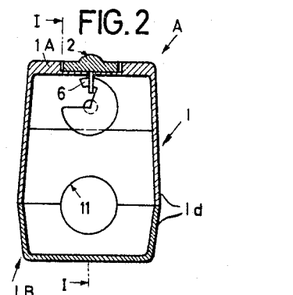
FIG. 2 is a transverse section as seen in the direction of arrows from the line II—II of FIG. 1.
Figure 3:
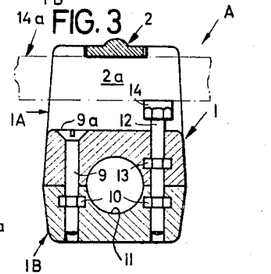
FIG. 3 is a transverse section as seen in the direction of arrows from the line III—III of FIG. 1.

Referring to FIGS. 1 to 3, there is shown a first clamping device A which comprises a two-piece base member 1 and a cover member or strap 2 which is secured to the base member by a pivot pin 3 which is parallel to its plane so that it may be moved by hand between the operative or locking position of FIGS. 1 to 3 and an open or idle position in which it enables the owner to insert or to remove a single ski or a pair of skis from a passage 2a. The clamping device may be used in unattached condition as shown in the drawings or it may be secured to the utility rack on an automotive vehicle. The passage 2a is completely surrounded by the members 1 and 2 and is dimensioned in such a way that a single ski or a pair of skis may extend therethrough with negligible clearance or without any clearance. In speaking of negligible clearance, I wish to state that the skis should be held against lateral movement or against twisting or turning even though they might be free to move slightly lengthwise, i.e., in a direction at right angles to the plane of FIG. 1. The distance between the upstanding side walls 1a, 1b of the base member 1 exceeds only slightly the width of that portion of a ski which extends through the passage 2a. The walls 1a, 1b surround two sides of the passage 2a, and the third side of this passage is surrounded by a bottom wall 1c which is located opposite the cover member 2 when the latter is moved to the operative position of FIG. 1. The bottom wall 1c is provided with bores to receive the heads and stems of bolts 9 or similar threaded fasteners which serve to connect the two sections 1A, 1B of the base member 1. Owing to the fact that the passage 2a will receive one or more skis with negligible clearance and that the width of the skis approaches the distance between the side walls 1a, 1b, a would-be thief or burglar cannot insert a lever or a similar tool in an effort to force the member 2 to its open position. Also, the skis overlie the openings in the bottom wall 1c so that the thief cannot gain access to the heads 9a of the fasteners which are recessed in the base member 1.

The end portion 4 of the cover member 2 is provided with an eye 5 which extends through an aperture in the top face of the base member 1 to receive a bolt 6 forming part of a suitable key-operated lock 7. The eye 5 is located in the path of movement of the bolt 6 when the member 2 is moved to the operative position of FIGS. 1 to 3.

The sections 1A, 1B of the base member 1 are connected to each other by several bolts 9 which extend into vertical openings provided in transverse partitions 8. As explained above, the heads 9a of the bolts 9 are recessed in the bottom wall 1c of the upper section 1A to make sure that they cannot be reached with conventional tools when the passage 2a receives one or more skis. The section 1A is U-shaped and carries the pivot pin 3 for the cover member 2. The sections 1A, 1B of the base member 1 may be produced by a casting or injection molding process, and these sections may consist of metal or synthetic plastic. As shown in FIG. 3, the bolts 9 mate with nuts 10 which are permanently embedded in the material of the lower section 1B to make sure that the bolts can be removed only upon pivoting of the cover member 2 and upon withdrawal of skis from the passage 2a. Thus, even if a thief or burglar has ample time to tamper with the clamping device, he is still prevented from gaining access to any of the bolts 9 excepting, of course, by actually destroying the clamping device which might result in damage to the skis so that the burglary attempt or the attempted theft will bring no profit to the perpetrator.

If the clamping device A is to be mounted on a tubular or rod shaped supporting element of a utility rack on the roof or another part of an automotive vehicle, the sections 1A, 1B are temporarily disconnected from each other by removing the bolts 9 so that a supporting element 11b (indicated in FIG. 1 by phantom lines) may be accommodated in a longitudinally extending channel comprising portions 11 provided in the partitions 8 and aligned portions 11a provided in the outer walls 1d of the sections 1A, 1B. The bolts 9 are then driven home to make sure that the base member 1 is rigidly secured to the supporting element 11b. Two or more clamping devices may be mounted in end-to-end position on a common supporting element. This supporting element 11b normally consists of tubular metallic stock as is well known from the art of utility racks for automobiles, buses and similar conveyances.

In order to convert it for use with one or two skis, the clamping device A of FIGS. 1 to 3 comprises adapters in the form of two vertically adjustable bolts or similar threaded elements 12 meshing with nuts 10 in the section 1B and with aligned nuts 13 which are embedded in the material of the section 1A. Each of these bolts is provided with a head 14 in the form of a cushion made of rubber or elastic plastic which may abut against one side of a ski 14a extending through the passage 2a at a level between the heads 14 and the inner side of the cover member 2. The stems of the bolts 12 may be threaded only along the lower portions thereof so that the bolts can be driven home to the extent shown in FIG. 3 but no further whereby a thief is prevented from rotating the heads 14 in any direction because a rotation in one direction is prevented by the ski 14a and a rotation in the opposite direction is prevented by the fact that the exposed part of the stem on each bolt 12 does not have any threads. If the owner desires to use the clamping device in connection with a pair of skis, the bolts 12 are withdrawn and the passage 2a is then large enough to accommodate two skis with their undersides placed in face-to-face abutment with each other. More than two adapter bolts may be used if desired, particularly if the base member 1 comprises three or more partitions 8. The cushions 14 prevent scratching of skis and, if desired, the underside of the cover member 2 may be coated with a layer of felt, sponge rubber or the like to protect the adjacent surface portions of the skis when the clamping device is in actual use. Similar protective cushions may be provided along the exposed sides of the walls 1a–1c.

It will be noted that the bolts 9 and 12 are disposed at the opposite sides of the channels 11. The width of the clamping device may be a small fraction of its length or height so that it occupies very little room and that its weight is negligible.

As a rule, the bolts 12 will be staggered with reference to each other, as viewed in the longitudinal direction of the base member 1. Thus, the right-hand bolt 12 of FIG. 1 will be located at one side of the right-hand channel 11, and the left-hand bolt 12 will be located at the other side of the left-hand channel 11. By looking at the passage 2a from above, this would mean that the bolts 12 are located diagonally opposite each other.

While I also consider using the clamping device independently of any fixed supporting elments, for example. to keep two skis together while ascending a mountain slope or during travel in a cable car, the clamping device will be particularly suited for use on utility racks, on the walls of storage rooms in hotels, ski lodges, railroad stations, bus stations, airport terminals, apartment houses and similar establishments. Also, I contemplate using the clamping device in the open, for example, on walls of buildings in mountain resort places or on specially constructed walls so that skiers returning from an excursion may leave the skis in the open, either overnight or for longer periods of time, and need not carry the skis home or to the hotel. Such clamping devices may be equipped with special locks which will allow withdrawal of a key in response to insertion of a coin or token so that the owner of a "parking place" for skis may earn money from renting space for storage of skis on an hourly, daily, nightly, weekly or other basis.

Figure 4:
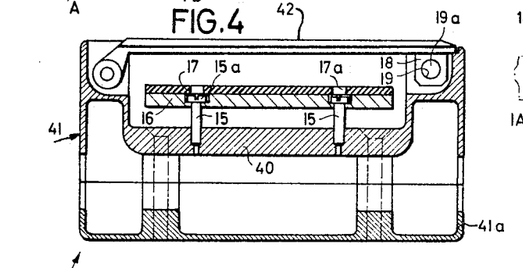
FIG. 4 is a longitudinal section through a second clamping device which comprises an adapter in the form of a rubber-coated platform.

FIG. 4 illustrates a slightly different clamping device B which is provided with a rigid plate-like or platform-like adapter 16 having a cushion 17 of rubber or the like and screws or bolts 15 which are threaded into a comparatively thick bottom wall 40 of an inner section 41 corresponding to the section 1A of the device shown in FIGS. 1 to 3. The heads 15a of the screws 15 are recessed into the adapter 16 and the cushion 17 is provided with openings 17a to enable the user to insert a screw driver in order to rotate the screws and to lower or raise the cushion 17 in a direction toward or away from a cover member 42. In this embodiment of my invention, the cover member 42 is provided with an eye 18 having a large-diameter opening 19 to receive a removable cartridge-like lock 19a of any known design.

Figure 5:
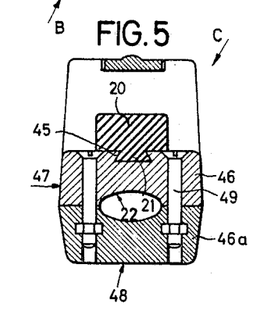
FIG. 5 is a transverse section through a third clamping device wherein the adapter comprises a single piece of rubber or similar elastically deformable material.

FIG. 5 illustrates a different clamping device C wherein the adapter comprises an elastic cushion 20 having a dovetailed anchoring portion 21 received in a complementary groove 45 provided in the upper side of a bottom wall 46.

In this embodiment, the bottom wall 46 of the upper or inner section 47 of the base member is secured to the lower section 48 by two or more pairs of symmetrically arranged bolts 49, only one pair having been shown in FIG. 5.

The bolts 49 may be removed if the sections 47, 48 are to be taken apart so that the clamping device may be mounted on a supporting element of oval or other non-circular cross section. The sections 47, 48 define a channel 22 of oval cross section to take an oval supporting element or a supporting element of polygonal cross section. An advantage of this oval channel is that the clamping device cannot rotate on its support.

It goes without saying that the adapter 20 and the bottom wall 46 may be secured to each other in a number of different ways. For example, this adapter may be provided with openings to receive bolts or similar fasteners. Also, the channel 22 may be replaced by a channel of polygonal (rectangular or square) cross section.

Figure 6:
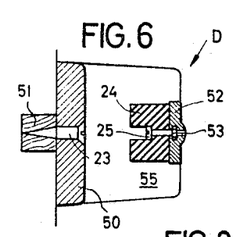
FIG. 6 is a transverse section through a fourth clamping device wherein the adapter is secured to the cover member.

Referring to FIG. 6, there is shown a portion of a very simple clamping device D which comprises a one-piece base member 50 secured to a stationary supporting element 51, for example, to a wooden board or strip in the storage room of a hotel, ski lodge or a similar establishment. The base member 50 is hinged to a cover member 52 which carries a detachable adapter in the form of a block-shaped cushion 24 secured to the inner side of the cover member by bolts 25. It will be noted that the stems of the bolts 25 (only one shown) mate with nuts 53 which are embedded in the material of the cover member 52. The means for detachably securing the base member 50 to the supporting element 51 comprises a series of wood screws 23, only one shown. In the embodiment of FIG. 6, the passage 55 between the inner side of the base member 50 and the adjacent side of the adapter 24 may accommodate a single ski. If the adapter is removed, the passage will accommodate a pair of skis.

It will be noted that the adapter or adapters may be mounted on the base member and/or on the cover member. For example, the adapter 24 of FIG. 6 may be used with the adapter 20 of FIG. 4 or 5 so that a single ski may be held between two resilient cushions. Of course, the combined thickness of the adapters will equal the thickness of a single adapter of the type shown in FIG. 5 or 6.

The clamping device D of FIG. 6 is especially suited for use in storage rooms of hotels or the like and, therefore, need not comprise a composite (two-piece) base member. Of course, each of the clamping devices A-C is equally useful for such purposes since all that the user has to do is to remove the lower section and to use the upper section in the same way as shown in connection with the base member 50 of FIG. 6. Thus, and if the owner desires to mount the clamping device A of FIGS. 1 to 3 on a stationary wall structure, he separates the section 1B from the section 1A and utilizes the openings in the partitions 8 to drive wood screws or metal screws beyond the underside of the section 1A and into the supporting structure. The same applies for the clamping device B wherein the lower section 41a may be separated from the upper section 41, and for the clamping device C wherein the section 46a may be separated from the section 46 so that the latter may form with the cover member 46b a simplified clamping device which may be secured to a wall by bolts 49 or by other types of fasteners.

It will be noted that the screws 23 in FIG. 6 pass through holes provided in the central portion of the base member 50 so that this base member is not subjected to unevenly distributed stresses.

Figure 7:
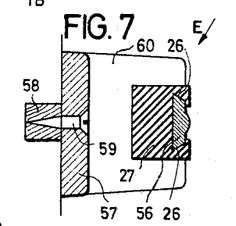
FIG. 7 is a similar transverse section through a fifth clamping device comprising a modified adapter which is also secured to the cover member.

FIG. 7 illustrates a clamping device E which is quite similar to that shown in FIG. 6 with the exception that a portion of the cover member 56 is dovetailed and is detachably received in a complementary groove 26 provided in the outer side of an elastic block-shaped adapter 27. The base member 57 is identical with the base member 50 and is secured to a stationary supporting element, e.g., to a rail 58, by means of one or more screws 59 or similar threaded fasteners. When the adapter 27 is attached to the cover member 56, the passage 60 will accommodate a single ski. Upon removal of this adapter, the space between the head of the screw 59 and the cover member 56 will accommodate two skis. The undersides of the base members 50 and 57 may be flat or arcuate so as to follow the outlines of the supporting elements 51, 58. It will be noted that the heads of the screws 23, 59 are fully concealed when the respective clamping devices accommodate a single ski or a pair of skis. This will be readily understood since, when the passage 60 of FIG. 7 receives a portion of a ski, the latter overlies the head of the screw 59 so that it is impossible to gain unauthorized access to this screw unless the clamping device and/or the ski is destroyed. The same applies when the adapter 27 is removed and the space 60 accommodates portions of two skis.

It is not necessary that the adapter 24 or 27 extend along the full length of the respective cover member. Thus, each of these adapters may consist of a short length of elastic material or each thereof may comprise two or more aligned portions as long as the adapter prevents access to the head of the respective screw or screws and as long as the adapter will be able to prevent rattling of the ski. If the adapter 24 or 27 does not extend along the full length of the respective cover member, it is preferably secured to the central portion of the cover member.

Figure 8:
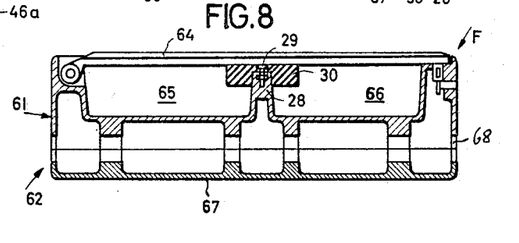
FIG. 8 is a longitudinal section through a sixth clamping device.

FIG. 8 illustrates a clamping device F which may be utilized to clamp two pairs of skis at a time. The upper or inner section 61 of the base member 62 is provided with an upstanding median wall or column 28 which cooperates with a median portion of a cover member 64 to separate the thus formed passage into two smaller passages 65, 66 each of which may receive a pair of skis. The manner in which the section 61 is coupled to the lower or outer section 67 is the same as described in connection with FIG. 1. The channel 68, defined by the sections 61 and 67, may receive a rod-shaped or tubular supporting member when the clamping device F is mounted on a utility rack or the like. When the section 67 is removed, the section 61 may be bolted directly to the chassis of an automotive vehicle, to a supporting rail corresponding to the supporting member 51 or 58, or to another stationary or movable supporting structure.

It will be noted that the median wall 28 does not extend all the way to the cover member 64 so that it provides room for a narrow web on an elastic adapter 30 which is fixed thereto by one or more bolts or similar fasteners 29. Thus, a single adapter 30 suffices to reduce the volume of the passages 65, 66 so that each of these passages then receives a single ski. All that the owner has to do in order to convert the clamping device F for use in connection with two pairs of skis is to pivot the cover member 64 to open position and to remove the bolts 29 so that the adapter 30 may be detached from the column 28. The adapter 30 may be replaced by two or more adapters so that, in case of need, the device F may accommodate an odd number of skis.

The exact construction of many of the locking means which may be used in the improved clamping device forms no part of my invention. The selection of locking means will depend on the intended use of the clamping device, i.e., whether it is to be used on a vehicle, in a storage room, in a "parking" place, or per se. Any conventional lock which is small and reliable will do. The arrangement may be such that the key may be withdrawn only when the lock actually secures the cover member to the base member so that the key may remain in the hole and is taken out only when the user wishes to place the skis in storage or to mount them on a vehicle.

Figure 9:
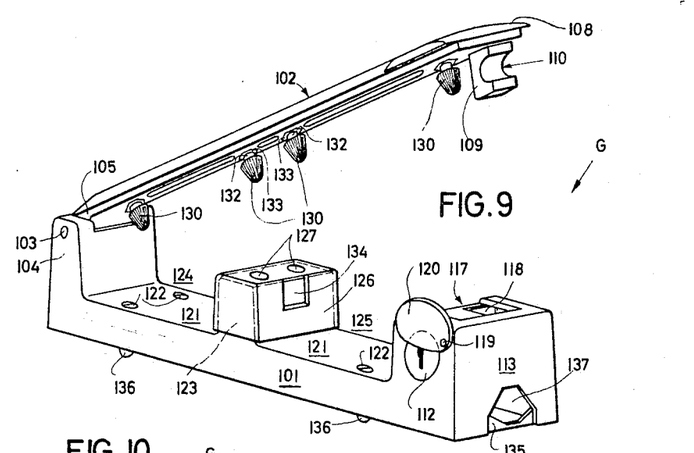
FIG. 9 is a perspective view of a seventh clamping device wherein the lower or outer section of the base member extends into the interior of the upper section.
Figure 10:
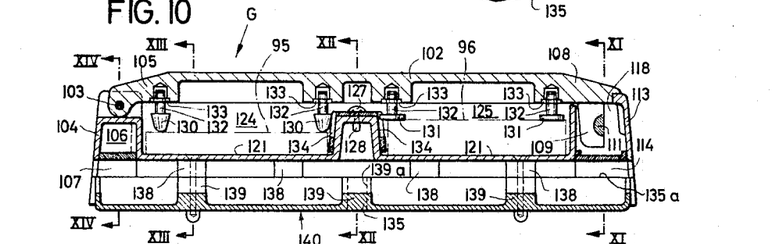
FIG. 10 is a longitudinal vertical section through the clamping device of FIG. 9 and illustrates the cover member in operative position.

FIGS. 9 and 10 illustrate a clamping device G which is particularly suited for use on vehicles because it is of very small height and because its parts exhibit very great resistance to deformation or breakage despite low weight and minimal expenditures in material. The feature that the clamping device G is one of minimum height is attributable mainly to the fact that the lower or outer section 135 may be at least partially concealed in the hollow upper or inner section 101 of the base member. The exact position of the section 135 with reference to the section 101 may be selected at the will of the owner so that the device G may be mounted on flat, rounded, oval or otherwise configurated supporting elements without any danger that the channel 137 which receives the supporting element would allow for insertion of burglar's tools or for penetration of snow, dust, rain or other corrosive substances. Such foreign matter could cause rusting of metallic parts, particularly of such parts which are normally concealed and, therefore, need not be finished with utmost precision.

Figure 14:
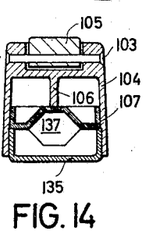
FIG. 14 is a transverse section as seen in the direction of arrows from the line XIV—XIV of FIG. 10 and illustrates the manner in which the cover member is hinged to the base member.

The section 101 supports an elongated cover member or strap 102 having a first end portion 105 (see also FIG. 14) which is articulately secured thereto by a pivot pin 103 in the same way as described in connection with FIG. 1. The pin 103 is received in a hollow column 104 at one end of the section 101. As shown in FIGS. 10 and 14, the column 104 is reinforced by a longitudinally extending stiffening rib 106 and also by a removable stiffening insert 107. One of these stiffening means might suffice, particularly if the column 104 is made of comparatively thick metallic or synthetic plastic sheet material. The insert 107 is snugly fitted into the cavity of the column 104.

Figure 11:
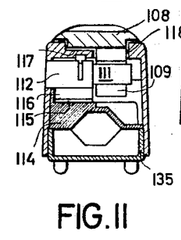
FIG. 11 is a transverse section as seen in the direction of arrows from the line XI—XI of FIG. 10 and illustrates the locking means of the clamping device.

The other end portion 108 of the cover member 102 is provided with a female locking element 109 having a transversely extending semicylindrical recess 110 for the bolt 111 of a locking device 112 which is mounted in a column 113 at the right-hand end of the section 101. The bolt 111 is of semicylindrical shape and may fill the recess 110. The column 113 is hollow and is reinforced by a tightly fitted stiffening insert 114, see also FIG. 11. The upper side of the insert 114 is provided with a slot 115 receiving a portion of a housing 116 for the locking device 112. The top face of the column 113 has a rectangular depression 117 which is overlapped by the end portion 108 when the cover member 102 is moved to the position of FIG. 10. This is of advantage because the cover member prevents entry of dust or moisture into the interior of the column 113 and thus protects the locking mechanism of the device 112. An oval shield 120 is fixed to a rivet 119 carried by the column 113 so as to normally conceal the keyhole in the locking device 112. The purpose of this shield 120 is to prevent entry of dust or moisture into the keyhole. If desired, the rivet 119 may carry a small torsion spring which will tend to keep the shield 120 in sealing position. The bottom surface in the depression 117 has a cutout 118 for the female locking element 109.

It is well known that the exact configuration (cross section) of skis depends on many factors, namely, whether the skis consist of wood, plastic or metal, whether the skis are used for jumping, for slalom or long distance travel over flat terrain, whether the skis are to be used by adults or children, whether the skis are expensive or inexpensive, whether the skis are to be used by military personnel or by sportsmen, and many others. Furthermore, each manufacturer will normally produce his own type of skis so that I prefer to provide the improved clamping device with means which enable the owner to rapidly adjust the cross sectional area or areas of one or more passages which are defined by the cooperating base and cover members when the clamping device is ready to be locked. The provision of such adjusting means is further necessary because the cross-sectional area of the skis varies from the one to the other end thereof so that adjustments are necessary if the owner decides to clamp one and the same pair of skis at a different point. Furthermore, by providing for such adjustments, I insure that there is no rattling when a pair of skis is mounted on the roof or another part of a moving vehicle. Still further, and as mentioned in connection with FIGS. 1 to 3, it is desirable to clamp the skis with negligible clearance to make sure that a would-be burglar or thief cannot insert a flat tool in order to pry open the clamping device or to gain access to pairwise arranged fasteners 122 which connect the base member to a supporting structure. The fasteners 122 extend through and comprise heads which are recessed in the bottom wall portions 121 of the section 101.

In order to avoid rattling of skis or exposure of fasteners 122, I prefer to construct the clamping device G in such a way that its section 101 surrounds with negligible clearance three sides of the ski or skis in one of the two passages 124, 125. This is achieved by the provision of a cupped adapter 126 which is placed onto a median column 123 of the section 101 and which is detachably secured to this column by one or more rivets 127 or similar fasteners. The column 123 separates the passages 124, 125 from each other and is disposed between the coplanar bottom wall portions 121. While it is conceivable to omit the median column 123 and to provide a single passage which can accommodate two or more pairs of skis, the construction of FIGS. 9 to 14 is preferred because the adjacent skis or pairs of skis need not come in actual contact with each other and because, in the absence of the column 123, the clearance between any given pair of skis and the adjacent parts of the base member 101 would add up to similar clearance or clearances between the other pair or pairs and the base member so that the resulting total clearance could enable a thief to use a simple tool in attempting to destroy the clamping device. Each of the passages 124, 125 at the opposite sides of the column 123 may receive a single ski or a pair of skis irrespective of the fact that the adapter 126 is mounted on the median column.

Figure 12:
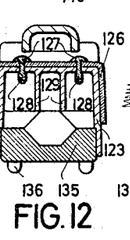
FIG. 12 is a transverse section as seen in the direction of arrows from the line XII—XII of FIG. 10 and illustrates an adapter which prevents lateral movements of skis in passages of the clamping device.

The bigger parts of the clamping device G including the adapter 126 may be made of metallic or synthetic plastic material. In order to insure that the adapter 126 may be rapidly detached from the column 123, the latter is preferably hollow and its top wall is formed with apertures for elastic stems 128 of the rivets 127 which may be forced therethrough (see particularly FIGS. 10 and 12) and thereupon expand in the interior of the column 123 to detachably hold the adapter on this column. Other types of readily separable fasteners may be used if desired. The device G may be furnished with several adapters 126 each with a different wall thickness so that the owner may select that adapter which will be best suited for use with a given pair of skis, i.e., which will reduce the clearance to a minimum. The rivets 127 and their stems 128 may consist of rubber or elastic plastic. As shown in FIG. 12, the column 123 may be reinforced with vertically extending stiffeners in the form of ribs 129 or the like.

While the adapter 126 compensates for differences in the width of skis, the clamping device G of FIGS. 9 to 14 further comprises additional adapters which serve to convert the device for retention of one or two pairs of skis. Such additional adapters resemble the bolts 12, 14 of FIGS. 1 to 3 in that each thereof comprises an elastic head 130 or 131 and a threaded stem 132 which may mesh with a nut 133 secured to the inner side of the cover member 102. The heads 130 are preferably conical, see FIGS. 9, 10 and 13. The heads 131 are disk-shaped, as shown in the right-hand part of FIG. 10, and may be substituted for the corresponding pair or pairs of conical heads 130. The nuts 133 are embedded in the material of the cover member 102. FIG. 10 shows that the stems 132 may be adjusted axially in a number of ways so that the passage 124 may accommodate a single ski 95 of small thickness and that the passage 125 may accommodate a thicker ski 96. Of course, it is not necessary that each of the heads 130 or 131 consist entirely of elastic material. It often suffices if such heads are coated with layers of elastic material to prevent scratching of skis but the main part of each head may consist of rigid metallic or plastic material.

The adapter 126 is provided with windows 134 each of which may accommodate a portion of the nearest head 130 or 131. This insures that the adapter 126 will be held in requisite position even if the rivets 127 are not used at all, for example, if the owner happens to lose such rivets and fails to purchase a new set. As a rule, the flat heads 131 will be used in connection with certain types of skis having greater than average thickness or when the clamping device is mounted on an automotive vehicle in such a way that the cover member 102 is caused to extend across the binding plate, i.e., when the cover member overlies the thickest portion of a ski. The cover member 102 will overlie the binding plate (on which the shoe rests when the ski is in use) when the clamping device is secured at the rear end of a vehicle so that the skis are inclined and would be likely to slide by gravity if the cover member would not overlap the binding plate which is located between the toe and heel portions of the bindings. If the ski is clamped in such a way, it cannot be lost even if the lower end is not supported by the rear bumper or by another part of the vehicle.

The section 135 cooperates with the section 101 in securing the clamping device on a utility rack or another supporting structure. The connection between the sections 101, 135 comprises the aforementioned fasteners 122. When used in such manner, the section 135 may be considered as a part of the fastener means for securing the clamping device to a supporting structure as shown in FIGS. 9 to 13, the section 135 is provided with spaced legs 136 which simultaneously serve to conceal the ends of openings for the fasteners 122. As explained above, the section 135 is received in the interior of the section 101 so that its upper end face 135a is concealed to prevent a would-be thief from inserting a sharp blade or a similar implement in an effort to pry the base member open and to thus separate the clamping device from its support. In addition, such construction of the section 101 reduces the overall height of the clamping device which is important on automotive vehicles. The box-shaped construction of the section 101 contributes to greater stiffness of the clamping device.

Figure 13:
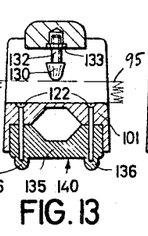
FIG. 13 is a transverse section as seen in the direction of arrows from the line XIII—XIII of FIG. 10 and illustrates the manner in which the inner and outer sections of the base member are coupled to each other.

The sections 101, 135 define between themselves a hexagonal channel 137, best shown in FIGS. 11 to 14, which may receive a supporting bar, tube or rail of circular, oval or polygonal cross section. It will be noted that this channel 137 comprises a series of aligned portions which are provided in part in the section 135 and in part in the section 101. As best shown in FIGS. 10 and 13, portions of this channel 137 extend through partitions 138, 139 of the sections 101, 135. It goes without saying that the channel 137 may be replaced by a channel of rectangular, oval or circular outline, depending on the intended mounting of the clamping device. The drawings shown that the stiffening elements 107, 114 are also provided with cutouts or recesses which are in registry with the channel 137 so that the stresses which develop when the fasteners 122 are driven home are distributed uniformly to all parts of the composite base member.

When the clamping device G is to be secured on a flat or slightly arcuate surface, the outer section 135 may be dispensed with so that the fasteners 122 may be driven directly into a supporting structure. Alternatively, the section 135 may be replaced by a different section having a flat surface to abut fully against a similar surface of the supporting structure. It is also possible to remove the legs 136 so that the flat underside 140 of the section 135 will come in direct contact with the flat supporting surface, for example, against a rail mounted on a wall in a storage room or the like. The fasteners 122 are then replaced by longer fasteners which will extend beyond the underside 140 and will penetrate into the supporting structure.

Of course, the section 135 may be provided with additional holes or bores which will allow for passage of nails, screws or bolts to fasten this section to a rigid support. One such opening (in one of the partitions 139) is shown at 139a in FIG. 10. If the section 135 is provided with one or more holes 139a, the operator proceeds as follows: In the first step, the section 101 is separated from the section 135 and the latter is fastened to a rail, wall or another flat or substantially flat support by means of fasteners extending through the holes 139a. In the next step, the section 101 is again connected with the section 135 by means of fasteners 122, and the clamping device is ready for use. The legs 136 may but need not be detached from the section 135. If the device G is to be mounted on an arcuate surface, for example, on the rear wall (below the rear window) of a sports car or another automotive road vehicle, the section 135 may be replaced by a differently configurated section, or the operator may use a suitable wedge or the like to compensate for the difference between the configuration of the section 135 and the surface of the supporting structure.

It is also possible to provide the clamping device of FIGS. 9–14 with suitable diaphragms or shields which will normally seal the ends of the channel 137 so as to prevent entry of dirt or moisture. For example, the clamping device may comprise two hinged shields similar to the shield 120 to keep out rain, dust and snow when the channel 137 does not receive a tube or the like. It is equally possible to provide the section 135 with slightly or readily deformable end wall portions which normally seal the ends of the channel 137 and which are deformed when the channel receives a portion of a rack or a rail.

A very important advantage of the clamping device G is that its basic construction remains the same even though it may be used with different types or sizes of skis and under many different circumstances. This is important because the molds or forms which are used for the production of the section 101 and cover member 102 remains unchanged even though the clamping device must be provided with a different section 135. The molds and forms constitute the most expensive parts of the manufacturing machinery, and the number of such molds or forms will have a direct bearing on the cost of the clamping devices. The configuration of the section 135 is comparatively simple so that the provision of several molds or forms for the manufacture of such sections constitutes a minor expense.

It is further clear that the clamping device of FIGS. 9 to 14 may be modified to accommodate a single ski or a single pair of skis. Thus, the length of the sections 101, 135 and of the cover member 102 may be reduced so that one of the passages 124, 125 is dispensed with and that, at the very most, the clamping device will accommodate a single pair of skis. It is also possible to simplify the construction and to reduce the dimensions of this clamping device by reducing the height of the section 101 so that each of the passages 124, 125 will receive a single ski. In such instances, the adapters 130, 131 may be dispensed with.

Figure 15:
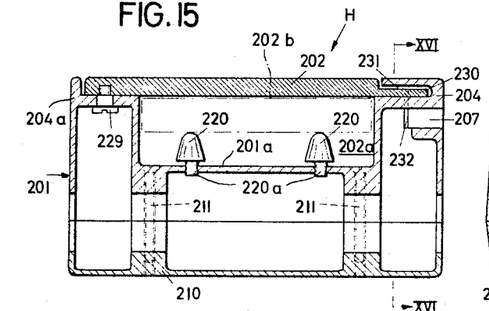
FIG. 15 is a longitudinal vertical section through an eighth clamping device wherein the cover member is rotatable in its own plane, the section of FIG. 15 being taken in the direction of arrows from the line XV—XV of FIG. 16.
Figure 16:
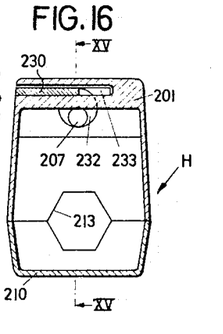
FIG. 16 is a transverse section as seen in the direction of arrows from the line XVI—XVI of FIG. 15 and illustrates the locking means of the clamping device.
Figures 17, 18, 19, 20:
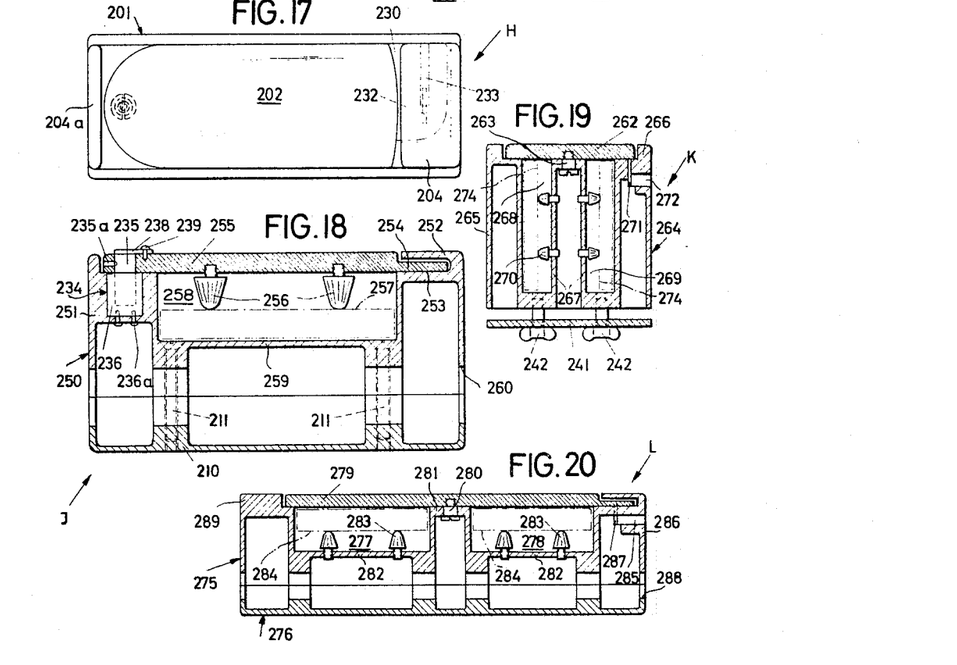
FIG. 17 is a top plan view of the structure shown in FIG. 15 or 16.
FIG. 18 is a longitudinal section through a ninth clamping device which is similar to that shown in FIGS. 15 to 17 and wherein the cover member may be rotated in its own plane in response to rotation of a key.
FIG. 19 is a vertical section through a tenth clamping device which is constructed in such a way that each ski may be located in a different plane and wherein the cover member is rotatable about an axis which is located between its ends.

FIGS. 15 to 17 illustrate a clamping device H wherein the cover member 202 is movable in its own plane and is arranged to rock about the axis of a vertical pivot member here shown as a screw 229 which is mounted in one column 204a of the section 201. This section is connected with a second section 210 by means of bolts 211, and the two sections define between themselves a channel 213 which may receive a tube, a rod, a rail or a similar support. The bottom wall 201a of the section 201 carries a pair of adapters each having a conical head 220 and a stem 220a threaded into the section 201 so that the adapters may be removed if the passage defined by the section 201 and cover member 202 is to accommodate two skis at a time. FIG. 15 illustrates in phantom lines a single ski 202b which is received in the passage 202a extending between the tips of the heads 220 and the underside of the cover member 202. The other column 204 of the section 201 is provided with a horizontal slot 231 which may receive a comparatively thin end portion 230 of the cover member 202. This end portion 230 is provided with a vertical slot 233, shown in FIG. 17, which may receive the rotary locking element 232 of a key-operated lock 207 mounted in the column 204.

The cover member 202 overlies the pivot 229, the heads 220 of the adapters, and the bolts 211 so that it is practically impossible to open the clamping device excepting by destroying its parts. The locking element 232 may resemble an eccentric disk which is turnable between an idle position and the position of FIG. 16 in which it enters the slot 233 and prevents rotation of the cover member 202 about the axis of the pivot 229.

FIG. 18 shows a clamping device J wherein the section 210 is the same as that of the clamping device H. The section 201 is replaced by a section 250 having two columns 251, 252, the latter of which is provided with a horizontal slot 253 to receive the end portion 254 of the cover member 255. This cover member is rotatable in its own plane about the axis of a lock 234 which includes a stationary part 236 secured to the column 251 by screws 236a, and a rotary part 235 which is secured to the cover member 255 by a radial screw 235a and whose upper end face has a keyhole normally concealed by an eccentrically mounted shield 238 secured to the exposed side of the cover member by a pin 239. Two adapters 256 are mounted at the underside of and are detachable from the cover member 255. A single ski 257 is indicated by phantom lines in the passage 258 between the tips of the adapters 256 and the bottom wall 259 of the section 250.

The construction of the lock 234 is such that, when the key is inserted into the rotary part 235, the operator may rotate the cover member 255 in response to rotation of the key. Thus, a single movement will suffice to open the lock and to simultaneously release a single ski 257 or a pair of skis received in the space bounded by the bottom wall 259 and columns 251, 252. The channel 260 defined by the sections 210, 250 of the base member may be of polygonal, oval or circular shape, depending on the configuration of the supporting means on which the device J is to be mounted. The connection between the sections 210, 250 comprises bolts 211.

The clamping device K of FIG. 19 is arranged to accommodate one or two pairs of skis in such a way that each ski is located in a separate plane extending vertically, as viewed in FIG. 19. Such stacking of skis results in substantial reduction in the dimensions of the clamping device. The cover member 262 is rotatably in its own plane about a pivot axis defined by a bolt 263 which is connected with the median portion of this cover member. The upper section 264 comprises three columns including two outer columns 265, 266 and a median column 267 which latter is connected with the head of the bolt 263. The passages 268, 269 which are respectively defined by the columns 265, 267 and 266, 267 may accommodate pairs of skis excepting when the column 267 supports adapters 270 whose configuration is the same as that of the adapters 220, 220a or 256. The cover member 262 carries a downwardly extending eye 271 which may be received in a slot of the column 266 to be engaged by a rotary bolt in a suitable key-operated locking device 272. The second section of the base member comprises a plate 241 which is secured to the section 264 by a series of winged bolts 242. This type of coupling device will be used when the bolts 242 can be applied in such a way that they are not accessible to a would-be thief. For example, the section 264 may be mounted at the outer side of a vehicle body which is provided with holes for the stems of the bolts 242 so that the wings of these bolts will remain in the interior of the vehicle. The upper side of the plate 241 may be coated with a layer of felt to prevent scratching of the support on which the device K is mounted. It is not always necessary to provide holes for the bolts 242. For example, many automobiles with rear engines are formed with a grillwork which is adjacent to the fan, and the stems of the bolts 242 may be inserted through the interstices in such grillworks If the owner desires to gain access to one or both skis 274 in the passages 268, 269, he merely inserts the key to open the locking device 272 and thereupon rotates the cover member 262 through 90 degrees so that the wings of this cover member simultaneously expose both skis. The adapters 270 will be removed if each of the passages 268, 269 is to receive two skis.

The clamping device L of FIG. 20 is analogous to that shown in FIG. 19 with the exception that the sections 275, 276 of the base member are longer because each ski extending through a first passage 277 is parallel with one of the skis extending through a second passage 278. The cover member 279 is rotatable about a vertical pivot member in the form of a bolt 280 which is secured in the median column 281 of the section 275. The bottom wall portions 282 of the section 275 carry detachable adapters 283 so that each of the passages 277, 278 may receive a single ski 284 unless the adapters are removed. The locking device 285 is mounted in the right-hand column 286 of the section 275 and cooperates with an eye 287 of the cover member 279. The bolt 280 may be removed upon separation of the section 276 from the section 275, and these sections together define an elongated channel 288 for a rail, a tube or a similar support. The left-hand column 289 of the section 275 preferably constitutes a stop which allows the cover member 279 to rotate in a single direction once the cover member is moved to the position of FIG. 20.

It will be noted that the clamping devices H, J, K and L share the feature of utilizing a cover member which is rotatable in its own plane, whereas the previously described clamping devices comprise cover members which are hinged at one of their ends so as to be pivotable about axes which are substantially parallel with the planes of the respective cover members. The axes of the pivot members 229, 235–236, 263 and 280 are perpendicular to the planes of the respective cover members.

Each of the clamping devices H, J, K and L may be modified in a number of ways without departing from the spirit of my invention. For example, the pivot members 263, 280 may be replaced by locks of the type shown in FIG. 18. The end columns of the section 264 of 275 may be made shorter provided they can keep the skis in the respective passages when the cover members are in locked position.

Figure 21:
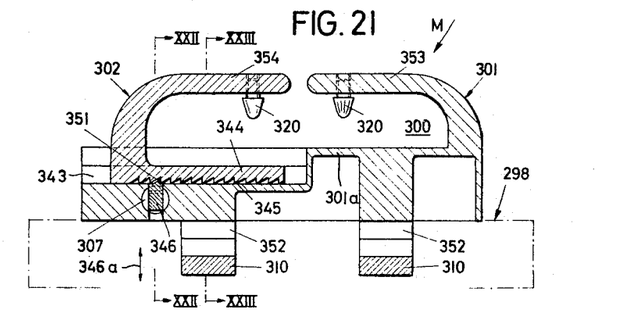
FIG. 21 is a longitudinal section through a twelfth clamping device wherein the cover member is mounted for translatory movement.
Figures 22, 23:
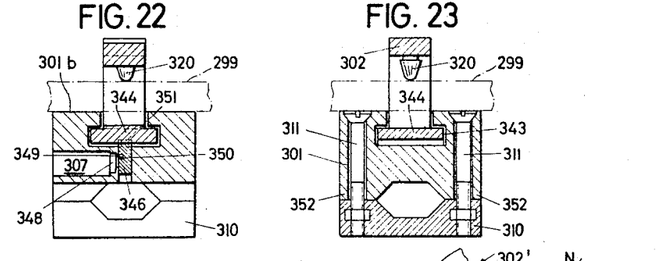
FIG. 22 is a transverse section as seen in the direction of arrows from the line XXII—XXII of FIG. 21 and illustrates the locking means of the clamping device.
FIG. 23 is a transverse section as seen in the direction of arrows from the line XXIII—XXIII of FIG. 21 and illustrates the manner in which the sections of the base member are coupled to each other.

FIGS. 21 to 23 illustrate a further clamping device M which utilizes a slidable cover member 302. The section 301 of the base member cooperates with the cover member 302 to define a passage 300 for one or two skis 299 shown in FIGS. 22 and 23. The bottom wall 301a of the section 301 is provided with a longitudinally extending groove 343 for a rack-shaped leg 344 of the cover member 302. This cover member further comprises an L-shaped bail 354 which cooperates with a similar bail 353 of the section 301 to define the passage 300 when the cover member is moved to the position of FIG. 21. The underside of the leg 344 is provided with inclined teeth 345 which are adapted to be engaged by a reciprocable pawl 346 mounted in the section 301 and movable up and down by a locking device 307. The rotary part 348 of the locking device 307 carries a motion transmitting projection 349 which may extend into a slot 350 of the pawl 346, see particularly FIG. 22, in order to reciprocate the pawl into or out of engagement with a selected tooth 345. Thus, the owner is free to adjust the width of the passage 300 without being compelled to use adapters of the type shown at 126 in FIG. 9. The bails 353, 354 carry elastic adapters 320 which may be detached if the passage 300 is to accommodate a pair of skis. The groove 343 is a so-called T-groove, see FIG. 22, and keeps the cover member 302 from wobbling even though it allows the leg 344 to move lengthwise when the pawl 346 is out of engagement with a selected tooth 345.

The directions in which the pawl 346 may be reciprocated by the projection 349 are indicated in FIG. 21 by a double-headed arrow 346a. The tip of this pawl resembles a tooth or wedge and may enter the gap between a pair of teeth 345 to prevent movement of the bail 354 in a direction away from the bail 353.

The underside of the section 301 is provided with extensions 352, best shown in FIG. 23, which may cooperate with the parts 310 of a second section in order to form a channel of hexagonal outline. FIG. 23 shows bolts 311 which serve to connect the section 301 with the parts 310 of the outer section.

In accordance with a slight modification which is not shown in the drawings, the extensions 352 may be omitted so that the section 301 will have a flat underside and is readily connectable to a flat surface. For example, such modified section 301 can be connected to a flat top surface of a rigid support 298 shown by phantom lines in FIG. 21.

The adapters 320 may be mounted on the wall 301a of the section 301.

Figures 24, 25:
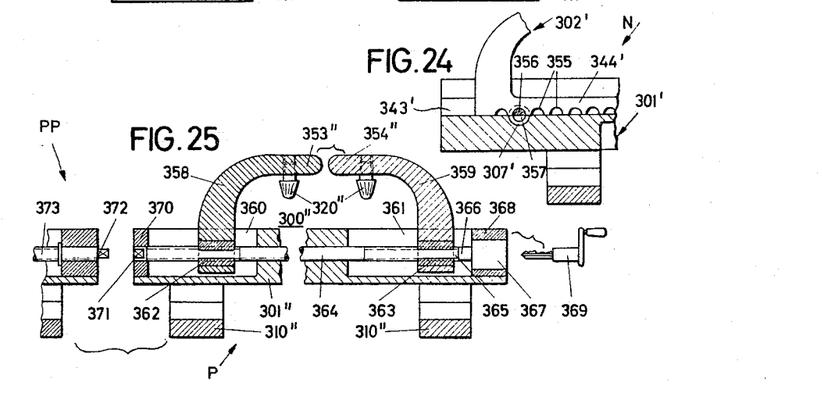
FIG. 24 is a fragmentary longitudinal section through a thirteenth clamping device which constitutes a slight modification of the device shown in FIGS. 21 to 23.
FIG. 25 is a longitudinal section through a pair of serially arranged clamping devices wherein the cover member comprises two movable sections and wherein a single key suffices to move and/or to lock the cover members of both clamping devices.

In FIG. 24, the clamping device N comprises a cover member 302′ which is nearly identical with the cover member 302 excepting that its leg 344′ comprises teeth bounded by semicylindrical recesses 355. Each of these recesses may receive a substantially semicylindrical rotary locking element or pawl 356 of a locking device 307′ which is mounted in the section 301′ of the base member. When the pawl 356 is rotated to the position of FIG. 24, the leg 344′ may slide in the T-groove 343′, but the cover member 302′ is automatically locked against such translatory movement when the pawl 356 extends into one of the recesses 355. The section 301′ comprises a semicylindrical recess 357 which receives the pawl 356 when the cover member 302′ is unlocked. The recesses 355 may but need not be provided along the entire underside of the leg 344′.

Referring finally to FIG. 25, the clamping device P comprises a two-piece cover member including two L-shaped sections or bails 358, 359 having prongs 353″, 354″ which overlie a passage 300″ for one or two skis. The bails 353″, 354″ carry adapters 320″ and the lower end portions of the sections 358, 359 are respectively provided with nuts 362, 363 for an elongated spindle 364 which is rotatable in the section 301″ of the base member. The spindle 364 is provided with two sets of oppositely inclined threads which are in mesh with the nuts 362, 363 so that, when the spindle is rotated by a crank-shaped key 369, the sections 358, 359 of the cover member may move toward or away from each other in order to allow for insertion or removal of skis from the passage 300″ or to lock one or two skis in this passage. The base member of the clamping device P comprises a multi-part section 310″ which is bolted to the section 301″ in the same way as described in connection with FIGS. 21 to 23. The section 301″ is provided with two T-grooves 360, 361 which respectively guide the lower end portions of the sections 358, 359 when the spindle 364 is rotated. The right-hand end portion 365 of the spindle is coupled to the rotary part 366 of a locking device 367 which is received in a plate 368 recessed in one end portion of the section 301″. The other end portion of the section 301″ accommodates a bearing plate 370 which receives the left-hand end portion of the spindle 364, and this end portion has a polygonal blind bore 371 to receive a complementary projection 372 at the right-hand end of a second spindle 373 forming part of a clamping device PP which is practically identical with the device P excepting that it need not be provided with a lock. If the two clamping devices are mounted so close to each other that the projection 372 enters the bore 371, the crank-shaped key 369 may be used to manipulate both pairs of sections 358, 359, i.e., the sections which constitute the cover member of the device P and the sections which constitute the cover member of the device PP. The two devices may be mounted on a common support, for example, on a tube in the utility rack of an automotive vehicle.

The nuts 362, 363 are permanently embedded in the material of the sections 358, 359 to prevent uncontrolled movements of these sections toward or away from each other. The spindles 364, 373 and the mating nuts may be provided with comparatively steep threads to make sure that a few revolutions of the crank-shaped key 369 will suffice to move the prongs 353″, 354″ to open or closed positions. There is no need for adapters which would prevent lateral play of skis in the passage 300″ because the vertical portions of the sections 358, 359 will automatically prevent rattling of skis in the passage 300″ if the spindle 364 is caused to perform a requisite number of revolutions.

Many other modifications of my improved clamping device are possible without departing from the spirit of the invention. Thus, in each of FIGS. 21 to 25, the cover member or its sections may be formed with true toothed racks which mesh with pinions, and such pinions may be rotated by the locking device in order to move the cover member or its parts to open or closing position. This will be best understood with reference to FIG. 24 wherein the pawl 356 could be replaced by a pinion so that rotation of such pinion by the key of the locking device 307′ would automatically result in longitudinal displacement of the cover member 302′.

In FIG. 25, one of the sections 358, 359 may be made rigid with the section 301″ so that the spindle 364 may be replaced by a less expensive spindle having a single set of threads meshing with the nut 362 or 363.

In all embodiments of my invention, the clamping device may comprise base and cover members which (or whose sections) may be produced by a casting, injection molding or similar process. Such parts may consist of metallic or synthetic plastic material whereby the parts may be provided with stiffeners which are embedded in their material. In other words, the stiffeners shown in FIGS. 9 to 14 may be replaced by ribs, plates, rods and other types of stiffening means which are actually embedded in the material of the sections. The stiffeners may be made of steel or steel wire. However, many commercially available rigid synthetic plastic materials will exhibit sufficient resistance to deformation so that they may be used without any reinforcing means.

It is also to be noted that each ski or each pair of skis may be locked by two or more longitudinally spaced clamping devices. For example, a first clamping device may be used to lock a pair of skis at a point close to the upturned front ends thereof and a second clamping device may be used to lock the same pair of skis across the binding plates. Furthermore, a single clamping device may be used with conventional elastically deformable clamping devices which are not theft- or burglar-proof, for example, by using a conventional clamping device on the rack of an automobile to clamp a pair of skis at one end whereas a theftproof clamping device of the type described hereinbefore may serve to clamp the same pair of skis at the other ends thereof.

It is also possible to modify the improved clamping device in such a way that its base and cover members will define three or more passages so that such clamping device may lock three or more pairs of skis.

In all embodiments of my invention, the dimensions of the passage or passages for the skis and the dimensions of the adapters may be selected in such a way that the adapters are merely adjusted when the corresponding passages should receive portions of one or more skis. For example, the bolts 12 of FIGS. 1–3 need not be detached from the base member 1 if the height of the passage 2a is such that it may accommodate two skis 14a when the bolts 12 are moved to their lower end positions, as viewed in FIGS. 1–3.

The records of police stations in ski resorts indicate that many thousands of skis are being stolen or mistakenly removed each year from automobiles, hotels, lodges, terminals, parking areas, ski lifts, restaurants, cafes and other places where skiers congregate. The improved clamping device will insure that the number of stolen or misplaced skis will be reduced to a minimum, and that the skis may be kept neatly and securely stacked to avoid injury to bypassers or loss when the skis are fastened to an automotive vehicle.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A clamping device for skis, comprising a base member; fastener means located in said base member for detachably securing said base member to a support structure; a cover member attached to and movable with reference to said base member between a first position in which said members define between themselves at least one passage for reception of a ski in such a way that a portion of the ski is surrounded by said members, and a second position in which the ski may be withdrawn from said passage; adapter means being adapted to be moved to a position in said passage for changing the effective cross-sectional area of said passage so that in dependence on the position of said adapter means said passage may accommodate portions of one or more skis; and a locking device arranged to positively lock said members to each other in the first position of said cover member.

2. The combination of a support with a clamping device for skis including a base member; fastener means securing said base member to said support; a cover member articulately fixed to and movable with reference to said base member between a first position in which said members define between themselves at least one passage for reception of a ski in such a way that a portion of the ski is surrounded by said members, and a second position in which the ski may be lifted out of said passage; adapter means being adapted to be moved to a position in said passage for changing the effective cross-sectional area of said passage so that in dependence on the position of said adapter means said passage may accommodate portions of one or more skis; and a locking device arranged to positively lock said members to each other in the first position of said cover member.

3. A clamping device for skis, comprising a base member including first and second interfitting sections defining between themselves an elongated channel adapted to receive a portion of a supporting structure on which the clamping device may be mounted, said first section being hollow so that it accommodates at least a portion of said second section; fastener means for detachably securing said first and second sections to one another; a cover member attached to and movable with reference to said first section of said base member between a first position in which said first section and said cover member define between themselves a passage for reception of at least one ski in such a way that a portion of the ski is completely surrounded by said first section and said cover member, and a second position in which the ski may be withdrawn from said passage; and a positive-lock locking device comprising cooperating parts on said members and arranged to positively lock said members to each other in the first position of the cover member.

4. A clamping device for skis, comprising a base member and a cover member; fastener means located in said base member for detachably securing said base member to a support structure; pivot means hingedly securing one end of said cover member to said base member so that the cover member is pivotable about said end thereof between a first position in which said members define between themselves at least one passage for reception of a ski in such a way that a portion of the ski is surrounded by said members, and a second position in which the ski may be withdrawn from said passage; adapter means adjustably secured to one of said members and extending into said passage, said adapter means being dimensioned in such a way that, upon adjustment thereof, said passage may accommodate portions of several skis; and a positive-lock locking device arranged to positively lock said members to each other in the first position of said cover member.

5. A clamping device for skis, comprising a base member having a first wall portion and a cover member having a second wall portion; fastener means located in said first wall portion for detachably securing said base member to a support structure, said fastener means having operating means for facilitating engagement and disengagement thereof; pivot means connecting said members so that the cover member is movable in its own plane between a first position in which said wall portions define between themselves at least one passage for reception of a ski in such a way that a portion of the ski is completely surrounded by said wall portions, and a second position in which the ski may be withdrawn from said passage; adapter means adjustably secured to one of said members and extending into said passage, said adapter means being dimensioned in such a way that, upon adjustment thereof, said passage may accommodate portions of several skis; and a positive-lock locking device arranged to positively lock said members to each other in the first position of said cover member.

6. A clamping device for skis, comprising a base member having a first wall portion and having an elongated groove; fastener means located in said first wall portion for detachably securing said base member to a supporting structure, said fastener means having operating means for facilitating engagement and disengagement thereof; a cover member having a second wall portion, said cover member having a portion slidably received in said groove so as to be movable with reference to said base member between a first position in which said wall portions define between themselves at least one passage for reception of a ski in such a way that a portion of the ski is completely surrounded by said wall portions and a second position in which the ski may be withdrawn from said passage; adapter means adjustably secured to one of said members and extending into said passage, said adapter means being dimensioned in such a way that, upon adjustment thereof, said passage may accommodate portions of several skis; and a positive-lock locking device arranged to positively lock said members to each other in the first position of said cover member.

7. A clamping device for skis, comprising a base member having a first wall portion; fastener means located in said first wall portion for detachably securing said base member to a supporting structure, said fastener means having operating means for facilitating engagement and disengagement thereof; a cover member having a second wall portion, said cover member being attached to and movable with reference to said base member between a first position in which said wall portions define between themselves at least one passage for reception of a ski in such a way that a portion of the ski is surrounded by said wall portions, and a second position in which the ski may be withdrawn from said passage, said fastener means being located in said first wall portion in such a position as to be located directly under the ski when a ski is accommodated in said passage so that said operating means are fully concealed by the ski which is accommodated in said passage; a locking device arranged to positively lock said members to each other in the first position of said cover member; and adapter means adjustably secured to one of said members and extending into said passage, said adapter means being dimensioned in such a way that, upon adjustment thereof, said passage may accommodate portions of several skis.

8. A clamping device as set forth in claim 7, wherein said passage is dimensioned and configurated to accommodate portions of two skis in response to adjustment of said adapter means.

9. A clamping device as set forth in claim 7, wherein said adapter means comprises threaded elements extending into tapped holes provided in said one member.

10. A clamping device as set forth in claim 9, wherein said threaded elements comprise cushions of elastic material which abut against a ski in said passage when the cover member is moved to said first position.

11. A clamping device as set forth in claim 9, wherein said threaded elements are staggered with reference to each other.

12. A clamping device as set forth in claim 7, wherein said adapter means comprises a platform detachably and adjustably secured to said one member.

13. A clamping device as set forth in claim 12, wherein said platform is provided with a ski-contacting cushion of elastic material.

14. A clamping device as set forth in claim 12, wherein said adapter means comprises bolts arranged to secure said platform to said base member.

15. A clamping device as set forth in claim 7, wherein said adapter means comprises elastic cushion means and anchoring means for detachably securing said cushion means to said one member so that, upon detachment of said cushion means, the passage defined by said members may accommodate portions of two skis.

16. A clamping device as set forth in claim 15, wherein said anchoring means comprises a dovetailed portion provided on said cushion means and received in a complementary groove of said one member.

17. A clamping device as set forth in claim 15, wherein said anchoring means comprises a dovetailed portion provided on said one member and received in a complementary groove provided in said cushion means.

18. A clamping device as set forth in claim 15, wherein said anchoring means comprises bolts meshing with nuts embedded in said one member.

19. A clamping device as set forth in claim 15, wherein said cushion means extends along at least a major portion of the length of said passage.

20. A clamping device as set forth in claim 15, wherein said cushion means extends along a minor portion of the length of said passage.

21. A clamping device as set forth in claim 7, wherein said adapter means comprises threaded elements meshing with threads in tapped holes provided in said one member and having ski-contacting heads of elastic material.

22. A clamping device for skis, comprising a base member having a first wall portion and a cover member having a second wall portion, one of said wall portions comprising in a column extending toward the other thereof; fastener means located in said first wall portion for detachably securing said base member to a supporting structure, said fastener means having operating means for facilitating engagement and disengagement thereof; pivot means connecting said members to each other so that said cover member is movable with reference to said base member between a first position in which said wall portions define between themselves a pair of passages disposed at the opposite sides of said column and each adapted to receive a portion of at least one ski in such a way that the ski is surrounded by said wall portions, and a second position in which skis may be withdrawn from the respective passages, said fastener means being located in said first wall portion in such a position as to be located directly under the ski when a ski is accommodated in said passage so that said operating means are fully concealed by the ski which is accommodated in said passage; and a locking device arranged to positively lock said members to each other in the first position of said cover member so that the skis cannot be withdrawn from said passages.

23. A clamping device as set forth in claim 22, further comprising adapter means secured to said column to prevent excessive clearance between the skis and said members.

24. A clamping device as set forth in claim 23, further comprising fastener means detachably securing said adapter means to said column.

25. The combination of an elongated rigid supporting element with a clamping device for skis including a base member having a first wall portion; fastener means located in said first wall portion for detachably securing said base member to said supporting element, said fastener means including operating means for facilitating engagement and disengagement thereof; a cover member having a second wall portion, said cover member being articulately secured to said base member and movable with reference thereto between a first position in which said wall portions define between themselves at least one passage for reception of a ski in such a way that a portion of the ski is surrounded by said wall portions, and a second position in which the ski may be lifted out of said passage; adapter means being adapted to be moved to a position in said passage for changing the effective cross-sectional area of said passage so that in dependence on the position of said adapter means said passage may accommodate portions of one or more skis; and a locking device arranged to positively lock said members to each other and to prevent movement of said cover member with reference to said base member in the first position of said cover member.

26. A clamping device for skis, comprising a base member including an inner section and an outer section, said sections defining between themselves an elongated channel adapted to receive a portion of a supporting structure on which the clamping device may be mounted and said inner section being hollow so that it accommodates at least a portion of said outer section, said inner section of said base member including a first wall portion; fastener means located in said first wall portion for detachably securing said inner and outer sections to one another, said outer section being relatively movable with respect to said inner section into and out of engagement with said portion of said supporting structure in response to engagement and disengagement, respectively, of said fastener means; a cover member having a second wall portion, said cover member being articulately connected with said inner section and movable between a first position in which said first wall portion and said second wall portion define between themselves at least one passage adapted to receive a portion of at least one ski in such a way that the ski is surrounded by said wall portions, and a second position in which the ski may be lifted out of said passage, said fastener means being located in said first wall portion in such a position as to be located directly under the ski when a ski is accommodated in said passage so that said operating means are fully concealed by the ski which is accommodated in said passage; and a locking device arranged to lock said cover member against movement with reference to said inner section in the first position of said cover member.

27. A clamping device for skis, comprising a base member; a cover member attached to and movable with reference to said base member between a first position in which said members define between themselves at least one passage for reception of at least one ski in such a way that a portion of the ski is surrounded by said members, and a second position in which the ski may be withdrawn from said passage, said base member having a substantially flat underside and having openings extending from said passage to said underside; a stationary supporting element adjacent to said underside; fastener means extending through said openings and securing said base member to said supporting element, said openings being located in said base member in such a position as to be located directly under a ski accommodated in said passage so that said fastener means in said openings are fully concealed from view and are out of reach of burglar's tools when the passage receives a portion of at least one ski and said cover member is in said one position; and a locking device arranged to positively lock said members to each other in the first position of said cover member.

28. A clamping device for skis, comprising an elongated base member including an inner and an outer section, said sections defining between themselves an elongated channel adapted to receive a portion of a supporting structure on which the clamping device may be mounted and said inner section being hollow so that it accommodates at least a portion of said outer section, said inner section of said base member including a first wall portion; fastener means located in said first wall portion for detachably securing said inner and outer sections to one another, said outer section being relatively movable with respect to said inner section into and out of engagement with said portion of said supporting structure in response to engagement and disengagement, respectively, of said fastener means; an elongated cover member having a second wall portion, said cover member being attached to and movable with reference to said base member between a first position in which said wall portions overlie each other and define between themselves at least one passage for reception of at least one ski in such a way that a portion of the ski is completely surrounded on three sides by said base member and on the fourth side by said cover member, and a second position in which the ski may be withdrawn from said passage; and a positive-lock locking device at least a portion of which is permanently mounted within said hollow body of said base member and arranged to positively lock said members to each other in the first position of said cover member so that, upon locking thereof, the cover member is fixed with reference to said base member.

29. The combination of an elongated rigid supporting element with a clamping device for skis including a base member having a first wall portion; fastener means located in said first wall portion for detachably securing said base member to said supporting element, said fastener means including operating means for facilitating engagement and disengagement thereof and said fastener means comprising a section defining with said base member channel means for reception of said supporting element; a cover member having a second wall portion, said cover member being articulately secured to said base member and movable with reference thereto between a first position in which said wall portions define between themselves at least one passage for reception of at least one ski in such a way that a portion of the ski is surrounded by said wall portions, and a second position in which the ski may be lifted out of said passage, said fastener means being located in said first wall portion in such a position as to be located directly under the ski when a ski is accommodated in said passage so that said operating means are fully concealed by the ski which is accommodated in said passage; and a locking device arranged to positively lock said members to each other and to prevent movement of said cover member with reference to said base member in the first position of said cover member.

References Cited by the Examiner

UNITED STATES PATENTS

| | | | |
|---|---|---|---|
| 941,779 | 11/1909 | Hodgkins | 211—8 |
| 1,816,334 | 7/1931 | Matthews | 211—8 |
| 2,042,086 | 5/1936 | Aubert | 280—11.37 |
| 2,106,503 | 1/1938 | Hendrick | 224—29 |
| 2,133,883 | 10/1938 | Aubert | 280—11.37 |
| 2,562,178 | 7/1951 | Djos | 280—11.37 |
| 2,581,824 | 1/1952 | Windahl | 280—11.37 |
| 2,956,813 | 10/1960 | Madden | 280—11.37 |
| 2,963,165 | 12/1960 | Steiner | 211—60 |
| 3,114,487 | 12/1963 | Miller et al. | 224—45 |

FOREIGN PATENTS

| | | |
|---|---|---|
| 177,071 | 12/1953 | Austria. |
| 224,477 | 11/1962 | Austria. |
| 1,090,070 | 6/1957 | France. |
| 363,439 | 11/1922 | Germany. |
| 55,885 | 11/1935 | Norway. |
| 262,303 | 9/1949 | Switzerland. |
| 316,062 | 10/1956 | Switzerland. |

CLAUDE A. LE ROY, *Primary Examiner.*

CHANCELLOR E. HARRIS, *Examiner.*

J. H. LACHEEN, J. F. FOSS, *Assistant Examiners.*